United States Patent [19]

Hyakumura

[11] Patent Number: 4,999,508
[45] Date of Patent: Mar. 12, 1991

[54] OPTICAL FILM THICKNESS MEASURING DEVICE FOR MEASURING TWO-LAYER FILM THICKNESSES USING SPECTRAL REFLECTANCE

[75] Inventor: Kazushi Hyakumura, Hachiouji, Japan

[73] Assignee: Olympus Optical Co., Ltd., Tokyo, Japan

[21] Appl. No.: 459,276

[22] Filed: Dec. 29, 1989

[30] Foreign Application Priority Data

Dec. 29, 1988 [JP] Japan ................................ 63-335482

[51] Int. Cl.$^5$ ............................................ G01N 21/86
[52] U.S. Cl. ..................................... 250/560; 356/382
[58] Field of Search .................. 250/560, 56; 356/376, 356/381, 382

[56] References Cited

U.S. PATENT DOCUMENTS

| | | | |
|---|---|---|---|
| 4,208,240 | 6/1980 | Latos | 356/381 |
| 4,555,767 | 11/1985 | Case et al. | 356/381 |
| 4,676,647 | 6/1987 | Kikkawa et al. | 356/382 |
| 4,787,749 | 11/1988 | Ban et al. | 356/382 |

FOREIGN PATENT DOCUMENTS

63-32307 2/1988 Japan .

OTHER PUBLICATIONS

Tang et al., "Automatic Design of Optical Thin-Film Systems–Merit Function and Numerical Optimization Method", J. Opt. Soc. Am./vol. 72, No. 11, Nov., 1982, pp. 1522–1527.

Dobrowolski, "Completely Automatic Synthesis of Optical Thin Film Systems", Applied Optics vol. 4, No. 8, Aug., 1965, pp. 937–946.

*Primary Examiner*—David C. Nelms
*Assistant Examiner*—Stephone B. Allen
*Attorney, Agent, or Firm*—Cushman, Darby & Cushman

[57] ABSTRACT

The optical film thickness measuring device comprises a spectral reflectance measuring device for measuring spectral reflectance of two layers of a two-layer optical film, a memory device for storing, as reflectance data theoretical values of optical thickness and refractive index of each layer of the two-layer optical film as well as those of reflectance of the two-layer optical film, a data selecting device for selectively reading out the reflectance data corresponding to the measuring wavelengths for measured values of spectral reflectance and a film thickness deciding means for determining thickness of each layer of the two-layer optical film on the basis of the selected reflectance data and the measured spectral reflectance. This optical film thickness measuring device is capable of quickly and accurately measuring thickness of each layer of two-layer optical films.

4 Claims, 5 Drawing Sheets

OPTICAL FILM THICKNESS MEASURING DEVICE FOR MEASURING TWO-LAYER FILM THICKNESSES USING SPECTRAL REFLECTANCE

BACKGROUND OF THE INVENTION

1. Field of the Invention

The present invention relates to a device for measuring film thickness in a non-destructive and contactless mode by an optical means, and more specifically to an optical film thickness measuring device which is capable of simultaneously measuring thickness of each layer of a two-layer optical film.

2. Description of the Prior Art

When spectral reflectance of an single-layer transparent optical film is measured with a spectral reflectance measuring device, pluralities of local maximum values and local minimum values appear with variation of wavelength $\lambda$ on a spectral reflectance curve due to the effect of interference between the reflected lights, and show periodical variations in conjunction with film thickness. When number of maximum points or minimum points existing between a wavelength $\lambda_a$ producing a local maximum or minimum value and another wavelength $\lambda_b$ producing another local maximum or minimum value is represented by N and refractive index is designated by n, it is known that thickness d of this film is given by the following formula:

$$d = (N/2n)[(\lambda_b \cdot \lambda_a)/(\lambda_b - \lambda_a)]$$

Most of the conventional optical film thickness measuring devices are based on this relationship.

When thickness of a multi-layer optical film is measured, however, a spectral reflectance curve is obtained as a total sum on which the periodicities of the spectral reflectance curves of the individual layers are overlapped with one another, thereby making it impossible to determine thickness of each layer simply by utilizing the formula mentioned above. For this reason, it was conventionally practised, for determining thickness of each layer of a multi layer film, to prepare a reference piece made of the same material as that of the substrate of the multi-layer film, form a layer on the reference piece as a single layer film which is same as the layer of the multi-layer film each time a layer is formed on the multi-layer film and determine thickness of each layer of the multi-layer film by measuring the single-layer film. However, this method posed important problems that it requires a very long time for completing measurements of thickness of all the layers and that it cannot always permit measuring thickness of each layer of the multi-layer film accurately since thickness of the individual layers laminated in the state of the multi-layer film is not necessarily the same as that of the layers measured in the state of the single layer films.

In order to solve these problems, the inventor et al proposed, as Japanese Preliminary Patent Publication No. 32307/63, an optical film thickness measuring device which is capable of simultaneously measuring thickness of the individual layers of a multi-layer film. This film thickness measuring device will be briefly described below taking measurement of thickness of a two-layer film as an example. This film thickness measuring device is based on a fundamental concept that thickness of the individual layers are to be determined so as to obtain a reflectance curve which is optimumly approximated to a spectral reflectance curve actually measured. Since refractive index is a function of wavelength, reflectance R of this two-layer film is given as a function of thickness, refractive index and wavelength as follows:

$$R = R\{n_1(\lambda), d_1; n_2(\lambda), d_2; \lambda\}$$

wherein the reference symbols $n_1$ and $d_1$ represent refractive index and thickness respectively of a layer, and the reference symbols $n_2$ and $d_2$ designate refractive index and thickness of the other layer, and the reference symbol $\lambda$ denotes wavelength of the measuring light. When materials of the individual layers are known, $n_1(\lambda)$ and $n_2(\lambda)$ are constants at a definite wavelength, and reflectance R can be expressed as a function of the three variables:

$$R = R(d_1, d_2; \lambda)$$

When reflectance values measured at wavelengths $\lambda_1, \ldots, \lambda_k$ are represented by $R_m(\lambda_1), \ldots, R_m(\lambda_k)$, thickness of the layers are determined as the solutions of simultaneous equations of a number of k:

$$R_m(\lambda_k) = R(d_1, d_2; \lambda_i)$$
$$\vdots$$
$$R_m(\lambda_k) = R(d_1, d_2; \lambda_k)$$

Since strict solutions of the simultaneous equations are not always obtained in practice due to measuring errors and other conditions, thickness values of the two layers are determined as $d_1$ and $d_2$ which minimize total sum of differences between actually measured values and theoretical values at each wavelength. Accordingly, it is practised to set an evaluation function E such as:

$$E = \sum_{i=1}^{k} \{R_m(\lambda_i) - R(d_1, d_2; \lambda_i)\}^2$$

and determine values of $d_1$ and $d_2$ so as to minimize value of the evaluation function. The global optimization method is adopted as a technique for this practice. This method can be outlined as follows. Since rough thickness values of the layers can be estimated from the manufacturing conditions, etc. of the film to be measured, ranges of $d_1$ and $d_2$ covering these values are specified as possible regions of solutions (when $d_1$ is estimated as several hundred nanometers, for example, $100 \leq d_1 \leq 1000$ is specified as a possible region of the value of $d_1$). Pairs of values of $d_1$ and $d_2$ of an adequately selected number p is sampled at random within these regions (i.e., values of $d_1$ and $d_2$ are optionally selected within these regions) and values of the evaluation functions $E_1, E_2, \ldots, E_p$ corresponding these pairs are calculated by using these values of $d_1$ and $d_2$. This corresponds to evaluation of the difference between the spectral reflectance to be theoretically obtained from each pair of the two layers and the spectral reflectance of the two layers actually measured on an assumption of p pairs of the two layers having different thickness. It can therefore be said that the values of $d_1$ and $d_2$ which minimize the value of E (any one of $E_1, \ldots, E_p$) are close to actual thickness values of the two layers. Then, within the possible region of solutions specified above, a narrower range is selected as a new possible region which includes such pairs of ($d_1$ and $d_2$) giving relatively small values of E, pairs of ($d_1$ and $d_2$) are sampled at random within this narrower region and values of the evaluation functions are calculated on the basis of these pairs. The possible region is narrowed step by step by repeating the procedures described above until a pair of ($d_1$ and $d_2$) giving the minimum value of E is obtained. Since this method allows to accurately determine the minimum value of the evaluation function E, it permits determining thickness of layers of a multi-layer films with high accuracy and is very preferable for practice.

However, this method requires repeating calculations of reflectance $R(d_1, d_2; \lambda)$ and the evaluation function E in the number of sampled pairs of ($d_1$ and $d_2$), thereby posing a problem that it requires a long time from the measurement of spectral reflectance of a sample to determination of thickness of the individual layers. Especially in the recent years where objective lenses having relatively large numerical apertures are used for measuring spectral reflectance, the light for irradiating optical films includes the components in parallel with the optical axis and the components inclined at large angles with regard to the optical axis. For this reason, it is necessary for enhancing measuring accuracy to take considerations such as to use a mean value of reflectance of a plurality of light components having different angles of incidence as $R(d_1, d_2; \lambda)$ to be used for calculation of the evaluation function E, thereby further prolonging the time required for determination of layers of multi-layer film. Though it is possible to shorten the time required for measurement by selecting wider wavelength intervals so as to reduce number of k for $\lambda_1$, ..., $\lambda_k$ or decreasing the number of pairs of ($d_1$ and $d_2$) to be sampled, such a measure will mistake the means for the end since it will degrade measuring accuracy.

SUMMARY OF THE INVENTION

A primary object of the present invention is to provide an optical film thickness measuring device which is capable of quickly and accurately determining thickness of each layer of two layer films. According to the present invention, this object is attained by equipping with a spectral reflectance measuring means for optically measuring spectral reflectance of a two-layer optical film to be measured at a plural number of wavelengths which are different from one another, a memory means for preliminarily storing, as reflectance data, theoretical values of reflectance of the two-layer optical film calculated for predetermined multiple pairs of the parameter ($n_1d_1/\lambda$ and $n_2d_2/\lambda$) determined in conjunction with optical thickness and refractive indices of the first layer and the second layer of said two-layer optical film, and wavelengths of the light for measuring reflectance, a data selecting means for selectively reading out, from the storing means, the reflectance data ($n_1d_1/\lambda$ and $n_2d_2/\lambda$) corresponding to the measuring wavelengths of the measured spectral reflectance values obtained from the spectral reflectance measuring means, and a film thickness deciding means for determining thickness of each layer of the two-layer optical film on the basis of the reflectance data selected from the memory means and the spectral reflectance measured by the spectral reflectance measuring means.

In a preferred formation of the present invention, the memory means stores reflectance data corresponding to a plural number of wavelengths selected in such a manner that ratios of individual pairs of wavelengths neighboring each other are equal to one another, and the film thickness deciding means is so adapted as to be capable of selecting values of the parameters which minimize the difference between measured reflectance and the reflectance data corresponding thereto.

This and other objects as well as the features and the advantages of the present invention will become apparent from the following detailed description of the preferred embodiment when taken in conjunction with the accompanying drawings.

DESCRIPTION OF THE PREFERRED EMBODIMENT

Figure 1:
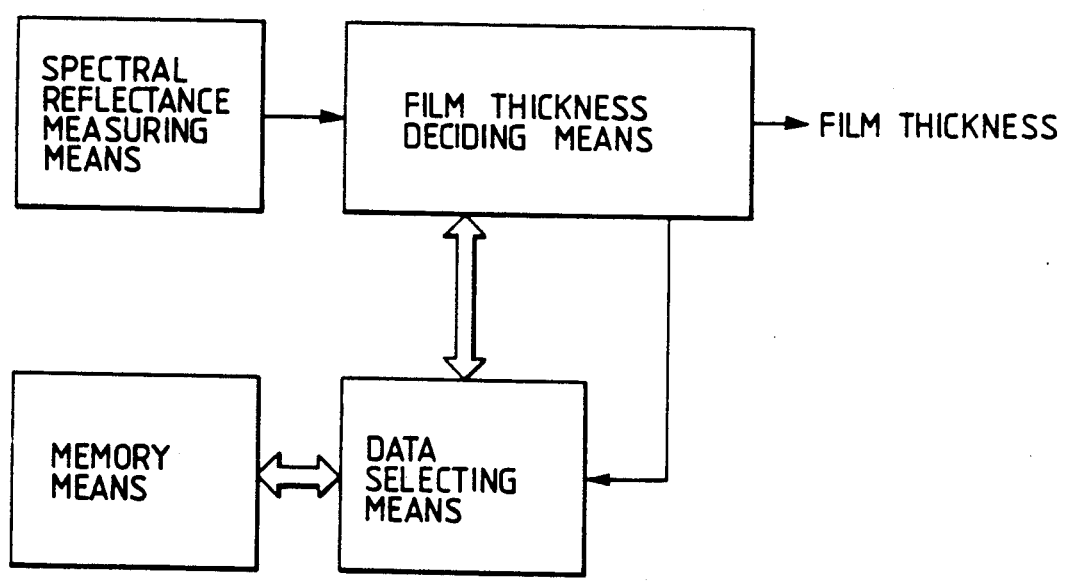
FIG. 1 is a block diagram illustrating the fundamental configuration of the optical film thickness measuring device according to the present invention.

Prior to description of the Embodiment of the present invention, the concept adopted as the basis of the present invention will be explained below:

The function expressing reflectance of the multi-layer film generally contains the variables $n_1$, $d_1$, $n_2$, $d_2$ and $\lambda$ always in the forms of $n_1d_1/\lambda$ and $n_2d_2/\lambda$ in the terms representative of phase conditions. That is to say, if the variables $n_1$ and $n_2$ are known, reflectance R of a two-layer film can be expressed as $R = (n_1d_1/\lambda$ and $n_2d_2/\lambda)$. Accordingly, it is possible to save the procedures for calculations for each measurement or shorten the time required from the measurement of reflectance to determination of film thickness by preliminarily calculating values of reflectance $R(n_1d_1/\lambda 0$ and $n_2d_2/\lambda)$ corresponding to a multiple number of values of $n_1d_1/\lambda$ and $n_2d_2/\lambda$. Paying attention to this point, the present invention allows the memory means to preliminarily store values of reflectance $R(n_1d_1/\lambda$ and $n_2d_2/\lambda)$ (hereinafter referred to as the reflectance data) calculated from a multiple number of pairs of ($n_1d_1/\lambda$ and $n_2d_2/\lambda$). At the stage to determine the values of ($d_1$ and $d_2$) which can approximate best an actually measured value of reflectance, $R(n_1d_1/\lambda$ and $n_2d_2/\lambda)$ is not calculated each time values of ($d_1$ and $d_2$) are changed, but the reflectance data corresponding to the measured values of ($d_1$ and $d_2$) are selected from the memory means and calculations are carried out by using the reflectance data. That is to say, the optical film thickness measuring device according to the present invention is equipped, as illustrated in FIG. 1, with the spectral reflectance measuring means for measuring spectral reflectance of a two-layer film to be measured, the memory means for storing the reflectance data ($n_1d_1/\lambda$ and $n_2d_2/\lambda$) preliminarily calculated from a multiple pairs of($n_1d_1/\lambda$ and $n_2d_2/\lambda$), the data selecting means for selecting, from the memory means, the reflectance data corresponding to the values of ($n_1d_1/\lambda$ and $n_2d_2/\lambda$) specified in conjunction with the spectral reflectance measured by the spectral reflectance measuring means, and the film thickness deciding means for determining thickness values ($d_1$ and $d_2$) of the two layers of the two-layer film on the basis of the selected reflectance data and the measured spectral reflectance. In order to determine film thickness with this device, a pair of thickness values ($d_{11}$ and $d_{12}$) (wherein the reference symbol $d_{21}$, for example, represents the value of layer thickness $d_2$ selected by the first sampling) are specified by the first sampling for comparison with the values of reflectance $R_m(\lambda_1), \ldots, R_m(\lambda_k)$ measured at wavelengths $\lambda_1, \ldots, \lambda_k$ by the spectral reflectance measuring means, and reflectance data $R(n_1d_{11}/\lambda_1), \ldots, (n_1d_{11}/\lambda_k, n_2d_{21}/\lambda_k)$ corresponding to $(n_1d_{11}/\lambda_1, n_2d_{21}/\lambda_1), \ldots, (n_1d_{11}/\lambda_k, n_2d_{21}/\lambda_k)$ are selected from the memory means. By using these data in an adequate evaluation function $$E(E = \sum_{i=1}^{k} \{R_m(\lambda_i) - R(d_1, d_2; \lambda_i)\}^2$$

is an example), degree of the overall differences between the actually measured values and the theoretical values are determined. The evaluation function must have such a nature as not to cancel the difference between an actually measured value and a calculated value at a certain wavelength with the difference between an actually measured value and a calculated value at another wavelength. With the values of layer thickness changed into ($d_{12}$, $d_{22}$), the reflectance data corresponding to $n_1d_{12}/\lambda_1, n_2d_{22}/\lambda_1) \ldots, (n_1d_{12}/\lambda_k, n_2d_{22}/\lambda_k)$ are selected and a value of the evaluation function E is determined once again. By repeating such calculations for all the necessary pairs of ($d_1$ and $d_2$) such values of ($d_1$ and $d_2$) as to minimize the evaluation function is searched. Alternately, by repeating such calculations while changing values of ($d_1$ and $d_2$) by an adequate optimization method values of ($d_1$ and $d_2$) which minimize the value E of the evaluation function E are determined. These values of ($d_1$ and $d_2$) are adopted as thickness values of the layers of measured the optical film.

Figure 2:
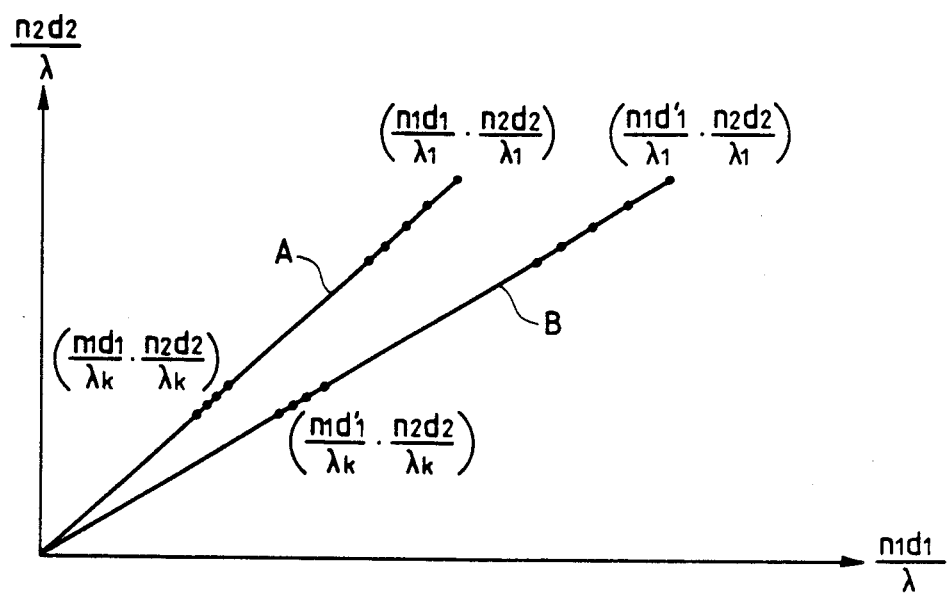
FIG. 2 and FIG. 3 are graphs descriptive of distribution of the reflectance data to be stored in the memory means.
Figure 3:
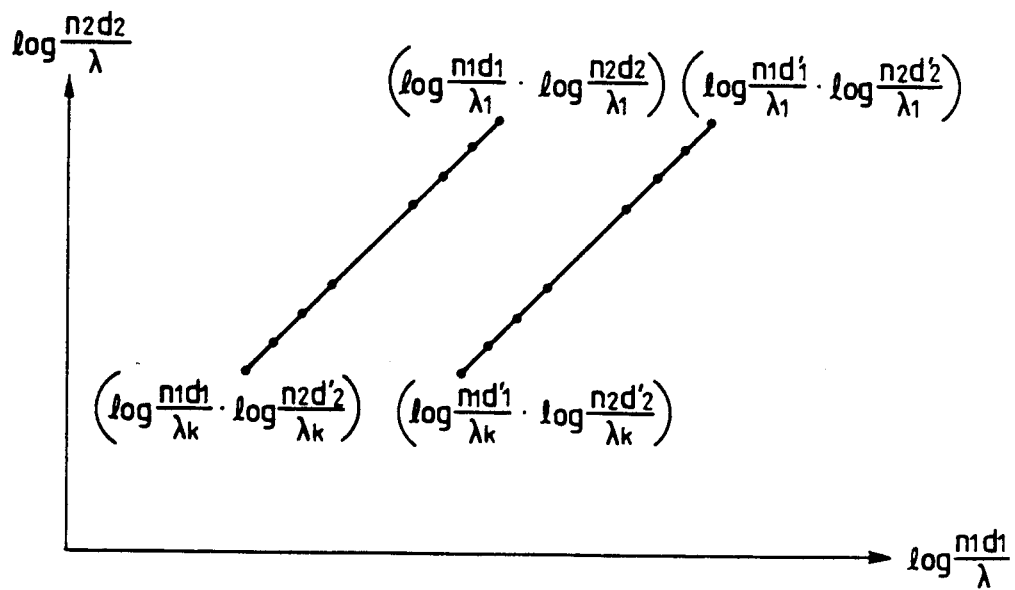

When wavelengths $\lambda_1, \ldots, \lambda_k$ are selected at equal intervals, the row of the points expressed by $(n_1d_1/\lambda_i$ and $n_2d_2/\lambda_i)_{i=1,\ldots,k}$ is arranged on a segment A which connects a point $(n_1d_1/\lambda_1)$ to a point $(n_1d_1/\lambda_k, n_2d_2/\lambda_k)$ on an coordinates plane on which $n_1d_1/\lambda$ is taken as the abscissa and $n_2d_2/\lambda$ is taken as the ordinate, but the spacings of the individual pairs of points neighboring each other are not equal to one another, thereby posing a problem that a set of the reflectance data is usable only for a single measurement. Let us now assume that a spacing of 10 nm is selected for measuring wavelengths in the following two cases:

(case 1)    $n_1d_1 = 100$,    $n_2d_2 = 200$,    $\lambda_1 = 100$ (case 2)    $n_1d_1 = 200$,    $n_2d_2 = 400$,    $\lambda_1 = 200$ Since $n_1d_1/\lambda_1 = 1$ and $n_2d_2/\lambda_1 = 2$ are common to both the case, the above-mentioned rows of points have a common start point and the points $(n_1d_1/\lambda_1$ and $n_2d_2/\lambda_2)$ are located on the same segment. When the points neighboring the start points are considered, however, they are different from one another between these cases since the point is located at $n_1d_1/\lambda_1 = 10/11$, $n_2d_2/\lambda_1 = 20/21$ in the case 1, whereas the point is located at $n_1d_1/\lambda_1 = 20/21$, $n_2d_2/\lambda_1 = 40/41$. Accordingly, the reflectance data used in the case 1 cannot be used in the case 2 and it is necessary to prepare reflectance data separately for the case 1 and the case 2. In addition, when the values of the pair of layer thickness for determining the minimum value of the evaluation function E are changed for example, into ($d_1$, and $d_2$), the above-mentioned row of points is shifted onto the segment B shown in FIG. 2 and spacings of the pairs of neighboring points become different from those on the segment A. Since coordinates of the points requiring the reflectance data are irregularly varied each time the layer thickness or measuring wavelength is changed as described above, it is necessary to store reflectance data for a nearly infinite number of values of $(n_1d_1/\lambda_i$ and $n_2d_2/\lambda_i)_{i=1,\ldots,k}$, but the memory means has a limited capacity, thereby posing a problem that required reflectance data are not available from the memory means in some cases. In such cases, however, the required reflectance data can be obtained by interpolating the reflectance data stored in the memory means. In addition, the above-mentioned problem can be solved by setting equal ratios for the individual pairs of neighboring measuring wavelengths, i.e., $\lambda_1/\lambda_2 = \lambda_2/\lambda_3 = \ldots \lambda_{k-1}/\lambda_k$, in place of the equal spacings of the wavelengths for measuring spectral reflectance, and storing reflectance data corresponding to $[\log(n_1d_1/\lambda)$ and $\log(n_2d_2/\lambda)]$ in the memory means. The reason for this solution can be described as follows. When the measuring points are plotted in the manner similar to that in FIG. 2 but taking $\log(n_1d_1/\lambda)$ as the abscissa and $\log(n_2d_2/\lambda)$ as the ordinate, the rows of points illustrated in FIG. 3 are obtained. In this case, the spacings of the individual pairs of neighboring points are expressed by $[\log(n_1d_1/\lambda_i) - \log(n_1d_1/\lambda_{i-1})]$ in the direction along the abscissa and determined independently of values of $n_1d_1$. In addition, the spacings of the individual pairs of neighboring points can be made constant independently of wavelengths by preliminarily specifying $\lambda_i/\lambda_{i-1} = $ constant. Since the same theory applies also to the direction along the ordinate, the points expressed by $[\log(n_1d_1/\lambda_i), \log(n_2d_2/\lambda_i)]_{i=1,\ldots,k}$ are arranged at equal spacings on the segment which connects a point $[\log(n_1d_1/\lambda_1), \log(n_2d_2/\lambda_1)]$ to another point $[\log(n_1d_1/\lambda_k), \log(n_2d_2/\lambda_k)]$ and is inclined at 45° with regard to both the coordinates axes. When point $[\log(n_1d_{11}/\lambda_i), \log(n_2d_{21}/\lambda_i)]$ is coincident with point $[\log(n_1d_{12}/\lambda_j), \log(n_2d_{22}/\lambda_j)]$ for two film thickness values of ($d_{11}$, $d_{21}$) and ($d_{12}$, $d_{22}$), the points neighboring thereto are also coincident with each other thereby making it possible to use a single set of reflectance data for plural numbers of wavelengths and film thickness values. If the logarithm is not used in contrast, coincidence between the point $n_1d_{11}/\lambda_i, n_2d_{21}/\lambda_i)$ and the point $(n_1d_{12}/\lambda_j, n_2d_{22}/\lambda_j)$ does not result in coincidence between the points neighboring thereto, and it is necessary to prepare reflectance data separately for individual measurements. When the memory means stores reflectance data corresponding to $[\log(n_1d_1/\lambda, \log(n_2d_2/\lambda)]$ as described above, relatively small quantities of data can be used for multiple measurements of film thickness or stored in the memory means and the interpolation is required in a smaller number of cases, thereby making it possible to accelerate measurements of film thickness. Especially when minimum units for variations of $d_1$ and $d_2$ are defined and values thereof are specified so as to be $\log(\lambda_{j+1}/\lambda_j) = \log[n_1(d_1+\Delta)/n_1d_1]$ or the like, the interpolation is completely unnecessary and film thickness can be determined in a very short time. Further, accuracy of film thickness measurement can be remarkably enhanced by storing, as the reflectance data, values which are corrected taking into consideration the numerical aperture of the objective lens to be used for measuring spectral reflectance.

Now, description will be made on the preferred Embodiment of the present invention.

Figure 4:
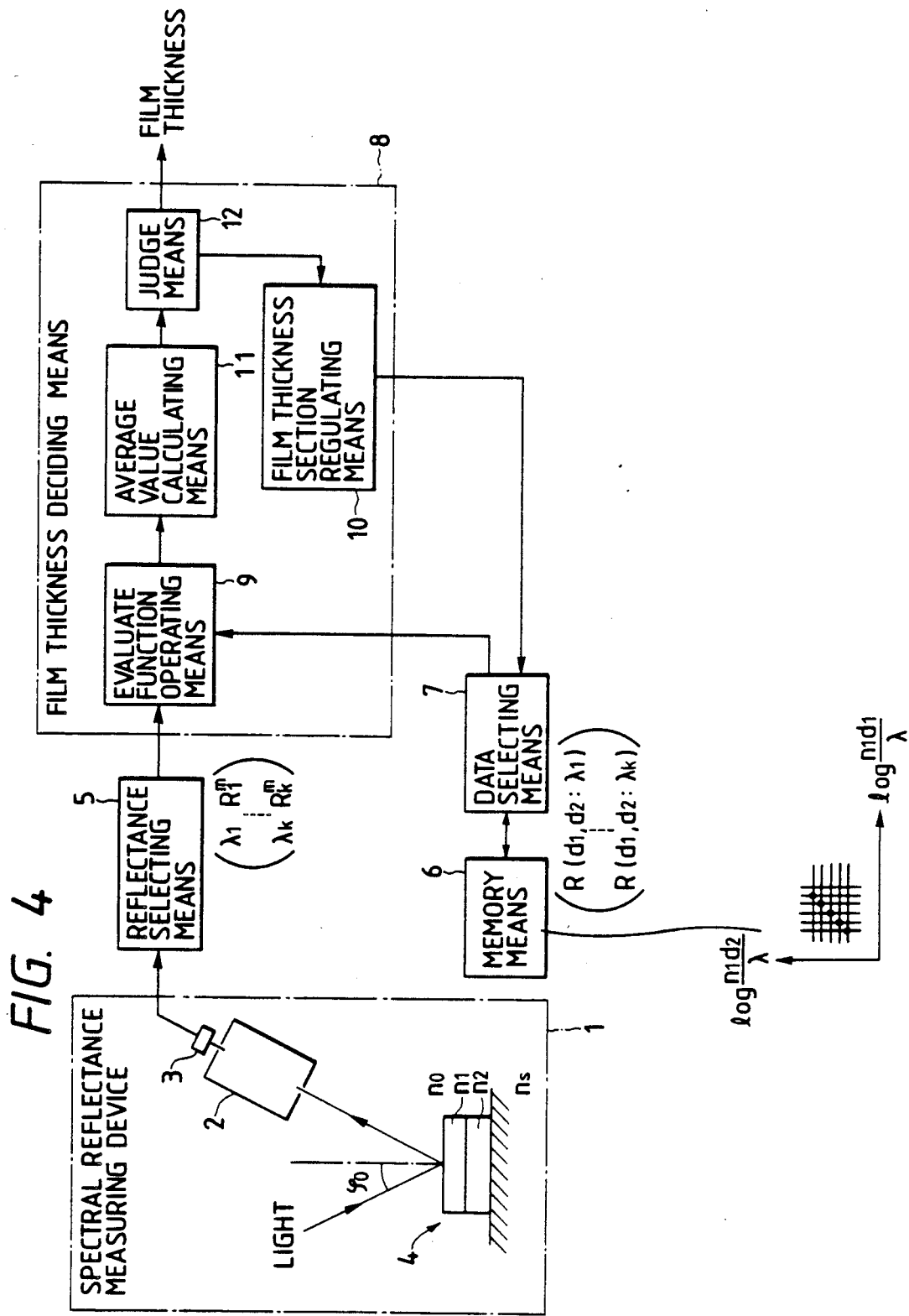
FIG. 4 is a block diagram illustrating an embodiment of the present invention.
Figure 5:
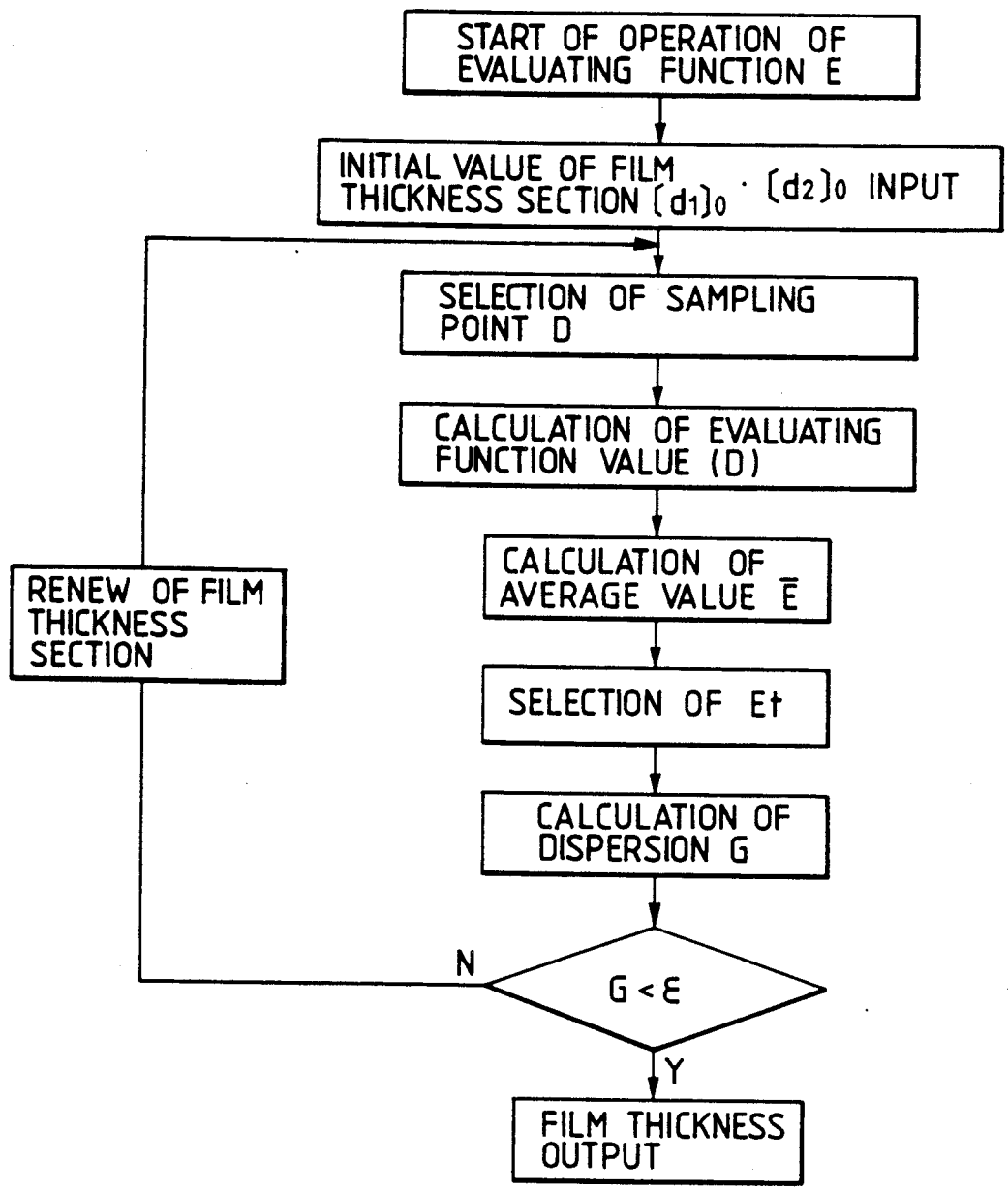
FIG. 5 is a flow chart illustrating certain steps of the film thickness deciding operation in the Embodiment.

FIG. 4 shows a block diagram descriptive of the Embodiment of the present invention and FIG. 5 illustrates a flow chart of the data processing in the film thickness deciding means.

In FIG. 4, the reference numeral 1 represents a spectral reflectance measuring device equipped with a monochromator 2 and a photoelectric converting means 3, the reference numeral 4 designates a two-layer film to be measured, the reference numeral 5 denotes a reflectance selecting means, the reference numeral 6 represents a memory means, the reference numeral 7 designates a reflectance data selecting means, the reference numeral 8 denotes a film thickness deciding means, the reference numeral 9 represents an evaluation function operating means, the reference numeral 10 designates a film thickness section regulating means, the reference numeral 11 denotes an average value calculating means, and the reference numeral 12 represents a judge means. Usable as the memory means 6 are the RAM disk and so on as well as the so-called memories such as RAM, but the floppy disk and the similar devices are not suited for accelerating measurements since these device require mechanical operations for data readout and consume a long time for reading out the stored data. Further, the functions of the reflectance selecting means 5 and those of the reflectance data selecting means 7 through the judge means 12 can be imparted to a microcomputer of the similar device.

In the spectral reflectance measuring means 1, the two-layer film 4 which consists of substances having refractive indices of $n_1$ and $n_2$ respectively arranged on a substrate is placed in a medium having a refractive index of $n_0$. A measuring light having a spectral distribution within a definite wavelength range is emitted from a light source (not shown) and allowed to be incident on the two-layer film 4, the light reflected by the two-layer film is received by the photoelectric converting means 3 through the monochromator 2, and spectral reflectance is measured continuously within a definite wavelength region. Out of measured reflectance values, the reflectance selecting means 5 selects the spectral reflectance values $R_m(\lambda_1)$, $R_m(\lambda_2)$, ..., $R_n(\lambda_k)$ in a number of k corresponding to wavelengths $\lambda_1, \lambda_2, \ldots, \lambda_k$. The wavelengths in the number of k are selected so as to be $\lambda_1/\lambda_2 = \ldots \lambda_{k-1}/\lambda_k$ = constant. When k has a large value, measuring accuracy will be enhanced but the time required for measurement will be prolonged Therefore, value of k should be selected properly taking into consideration both measuring accuracy and time required for measurement. On the other hand, the memory means 6 stores reflectance data which are determined on the basis of refractive indices $n_0$, $n_1$, $n_2$, $n_s$, wavelengths $\lambda_1, \ldots, \lambda_k$ and thickness values of the layers ($d_1$ and $d_2$), and taking into consideration the conditions for measuring spectral reflectance (angle of incidence of measuring light, NA of measuring light and so on). The preferred Embodiment is designed on an assumptions that the layers have thickness values $d_1$ and $d_2$ which are apart from each other, and that minimum units $\Delta_1$ and $\Delta_2$ for variations of the thickness values are selected so as to satisfy the following relationship:

$$log[(\lambda_{i+1})/\lambda_i] = log[n_1(d_1 + \Delta_1)/(n_1 d_1)]$$
$$= log[n_2(d_2 + \Delta_2)/(n_2 d_2)]$$

Accordingly, the memory means 6 stores multiple sets of reflectance data corresponding to pairs of thickness values ($d_1$ and $d_2$) determined at intervals of ($\Delta_1$ and $\Delta_2$) and wavelengths ($\lambda_1, \ldots, \lambda_k$). Though description is made only on the wavelengths $\lambda_1, \ldots, \lambda_k$ for simplicity in this Embodiment, it is possible, needless to say, to store reflectance data within a wider wavelength range in the memory means 6.

Figure 6:
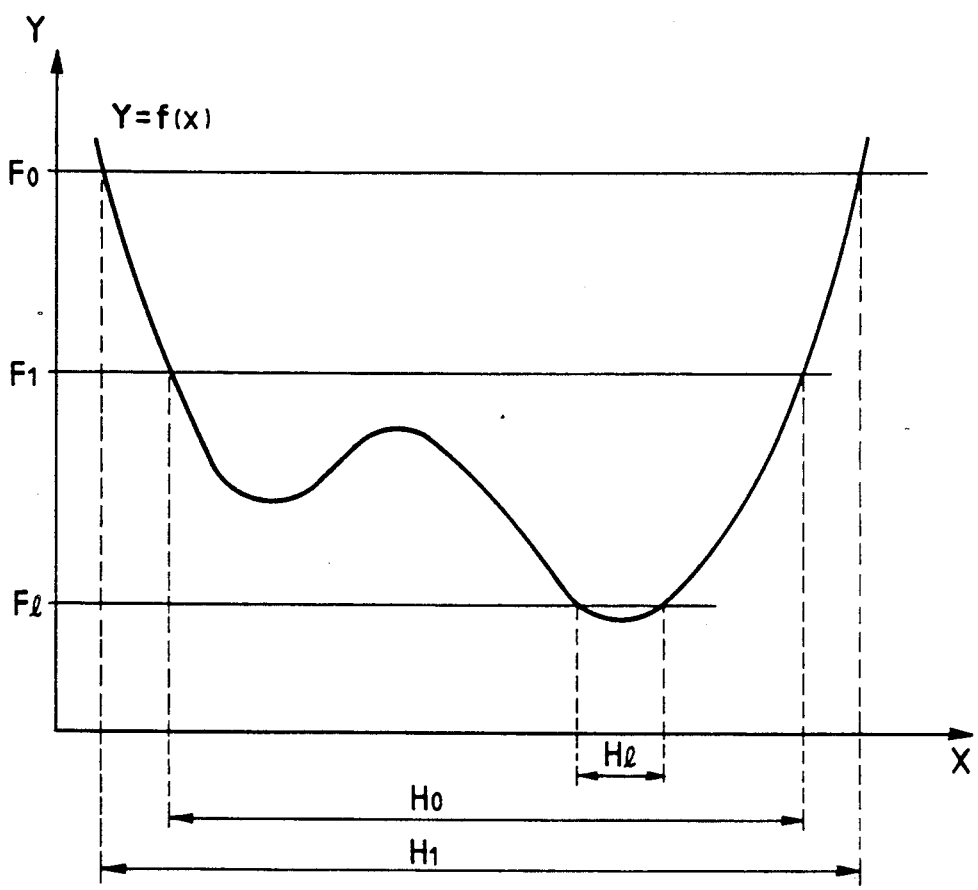
FIG. 6 is a curve descriptive of the global optimization method.

On the basis of the measured spectral reflectance and the stored reflectance data, film thickness is determined as described below:

First, variation ranges $(d_1)_0$ and $(d_2)_0$ of thickness of two layers are specified by the film thickness section regulating mean 10. Since thickness values of the layers of the two-layer film to be measured can generally be roughly estimated from the manufacturing condition and so on, the above-mentioned ranges are specified so as to cover these thickness values. A large number of thickness values selected at intervals of $\Delta_1$ and $\Delta_2$ are contained within these ranges. Then, values of ($d_1$ and $d_2$) are specified by the data selecting means 7, and the reflectance data $R(n_1 d_1/\lambda_1$ and $n_2 d_2/\lambda_1)$, ..., $R(n_1 d_1/\lambda_k$ and $n_2 d_2/\lambda_k)$ are read out of the memory means 6. On the basis of the reflectance data and the spectral reflectance $R_m(\lambda_1), \ldots, R_m(\lambda_k)$, a value of the evaluation function representing an overall difference in reflectance between the measured thickness of the two-layer film and theoretical value is determined by the evaluation function operating means 9. Used as the evaluation function in the preferred Embodiment is:

$$E = \left[ (1/k) \sum_{i=1}^{k} |R_m(\lambda_i) - R(d_1, d_2; \lambda_i)/t_i|^q \right]^{1/q} \quad (1)$$

wherein the reference symbol q represents an adequate positive integer, and the reference symbol $t_i$ designates a coefficient which represents an allowable degree of error and should have a large value for enhancing accuracy (for enlarging the difference between $R_m(\lambda_i)$ and $R(f_1 d_1/\lambda_i, n_2 d_2/\lambda_i)$), and vice versa. Since the overall difference between $R_m(\lambda)$ and $R(n_1 d_1/\lambda, n_2 d_2/\lambda)$ is the minimum at the point where the evaluation function has the minimum value, the values of $d_1$ and $d_2$ at this point can be considered as the thickness values of the two layers of the measured two-layer film. As the method to determine the minimum value of the evaluation function E, it can be considered to adopt one of various methods such as approximation to obtain the minimum value of the evaluation function while varying values of $d_1$ and $d_2$ at little steps so as to reduce value of E and a method to select the minimum value out of a large number of values of E calculated by using all the reflectance data stored in the memory means. As application of the conventional methods described above, determination of the minimum value of E by the global optimization method will be explained below as an example:

First, the concept of the global optimization method will be described with reference to FIG. 6. When a minimum value of a function $y = f(x)$ containing a variable x is to be determined, a variation section $H_0$ of the variable covering the minimum value thereof is specified. The maximum value of f(x) in this section is designated by $F_0$. When an adequate number of sampling points $x_1, \ldots, x_r$ are selected within this section and a mean $$F_1 = (1/r) \sum_{i=1}^{r} f(x_i)$$

of the values at these sampling points is calculated, $F_1$ is always smaller than $F_0$. Then, a new section $H_1$ of the variable x determined by $y=f(x)$ and $y=F_1$ is selected, an adequate number of sampling points are selected again within this new section and a mean value of $f(x)$ is calculated. By repeating these procedures, the means value is decreased at each step and $f(x)$ is converged toward the point at which the value of x corresponds to the minimum value of $f(X)$ as indicated by $F_l$ and $H_l$ whether or not a local minimum value exits. When difference between two means values $F_{l+1} - F_l$ or difference in width between two variation sections $H_{l+1} - H_l$ becomes smaller than a certain limit it can be considered that the minimum value of the evaluation function is substantially obtained.

In order to apply this method, the data selecting means 7 reads out reflectance data $R(n_1d_{11}/\lambda_1, n_2d_{21}/\lambda_1), \ldots, R(n_1d_{1s}/\lambda_k, n_2d_{2s}/\lambda_k)$ at wavelengths $\lambda_1, \ldots, \lambda_k$ corresponding to pairs of thickness values in a number of s $D_1 = (d_{11}, d_{21}), \ldots, D_s = (d_{1s}, d_{2s})$ are read out of the memory means 6 by random sampling within a thickness range $(d_1)_0$, $(d_2)_0$ set by the film thickness section regulating means 10, and the evaluation function operating means 9 calculates values of the evaluation function E for the individual pairs of thickness values $E(D_1), \ldots, E(D_s)$ to obtain a mean value thereof:

$$\overline{E}_1 = (1/s) \sum_{i=1}^{s} E(D_i)$$

Then, the judge means 12 selects $E_1, \ldots, E_u$ in a number of u ($u < s$) whichever are smaller out of above-mentioned $E(D_1), \ldots, E(D_s)$ and calculates dispersion from the mean of the values of the evaluation function:

$$G_1 = [1/(u - 1)] \sum_{i=1}^{u} (E_i - \overline{E}_1)^2$$

The judges means 12 compares $G_1$ with a predetermined value $\epsilon$ for judging degree of the conversion to the minimum value of the evaluation function. When $G_1$ is larger than $\epsilon$, the mean value $\overline{E}_1$ is not converged sufficiently to the minimum value of the evaluation function. In such a case, the film thickness section regulating means 10 sets new film thickness variation sections $(d_1)_1$ and $(d_2)_1$ within a region in which the evaluation function has values smaller than the means value $\overline{E}_1$, the data selecting means 7 specifies pairs of film thickness within this region by random sampling and reads out the specified pairs of thickness from the memory means 6, and the evaluation function operating means 10 calculates once again values of the evaluation function by using the read out data and spectral reflectance data $R_m(\lambda_1), \ldots, R_m(\lambda_k)$ for repeating steps described above. When $G_v < \epsilon$ is obtained after repeating the procedures v times, the means value $\overline{E}_v$ is very close to the value of the evaluation function at each sampling point. Accordingly, it is regarded in this condition that $f(x)$ has beer converged to the minimum value thereof, and a pair of ($d_1$ and $d_2$) selected adequately within the sections of $(d_1)_v$ and $(d_2)_v$ are outputted as thickness values of the layers of the optical film. Since the sections $(d_1)_v$ and $(d_2)_v$ can be narrowed very much by selecting a sufficiently small value for $\epsilon$, it is possible to converge thickness of a layer to a single value when thickness varies scatteredly as in the case of the Embodiment.

Since the Embodiment is so designed as to allow layer thickness to have scattered values only, it is capable of determining film thickness only with the reflectance data stored in the memory means 6 and permits determining film thickness very quickly without using interpolation. However, measuring accuracy may be a little low when the film thickness sections are selected at large intervals. In order to enhance measuring accuracy, it will be effective to adopt, for example, the following methods:

(1) to select film thickness values at very narrow intervals.

(2) to allow film thickness to have optional values and obtain reflectance data by interpolating the values stored in the memory means. However, such methods are not free from fears that they may require very enormous quantity of data to be stored in the memory means and that the interpolation may require a long time, thereby hindering the acceleration of the film thickness measurement. In contrast, the optimization by the attenuation minimum square method in the vicinity of the optimum values determined at the steps described above is more preferable sine it permits determining film thickness between scattered values, lessening the burden imposed on the memory means and reducing the prolonging of the calculation time. In addition when a limited quantity of reflectance data are stored in the memory means as in the case of the Embodiment, it is also effective not to adopt a particular optimization but to calculate values E of the evaluation function for all the stored pairs of ($d_1$ and $d_2$) and determine a mean value directly. Especially when relatively narrow sections $(d_1)_0$ and $(d_2)_0$ can be set for thickness of layers of an optical film to be measured, such a method requires short time for the calculations and is preferable from a view-point that it is free from the possibility of the global optimization method to select, at the step of the random sampling for calculation of values of E, the pairs of ($d_1$ and $d_2$) which are the same as those used at the preceding step.

What is claimed is:

1. An optical film thickness measuring device for measuring thickness of two layers of a two-layer film formed on a substrate, comprising a spectral reflectance measuring means for optically measuring spectral reflectance of the two-layer optical film at wavelengths different from one another, a memory means for preliminarily storing, as reflectance data, theoretical values of reflectance of said two-layer optical film determined for multiple number of pairs of the parameters ($n_1d_1/\lambda$ and $n_2d_2/\lambda$) determined in conjunction with optical thickness values $d_1$ and $d_2$, refractive indices $n_1$ and $n_2$ of the first layer and the second layer respectively of said two layer optical film, and wavelengths of a light for measuring spectral reflectance, a data selecting means for reading out, from said memory means, the reflectance data ($n_1d_1/\lambda$ and $n_2d_2/\lambda$) corresponding to the values of the measured spectral reflectance values obtained from said spectral reflectance measuring means, and a film thickness deciding means for determining thickness of each layer of said two-layer optical film on the basis of the selected reflectance data and the measured reflectance.

3. An optical film thickness measuring device according to claim 1 wherein said film thickness deciding means is adapted to select such values of the parameters ($n_1d_1/\lambda$ and $n_2d_2/\lambda$) as to minimize the difference between said measured spectral reflectance and said reflectance data corresponding thereto.

3. An optical film thickness measuring device according to claim 1 wherein said memory means is adapted to store the reflectance data at a plural number of wavelengths selected in such a manner that the ratios of pairs of neighboring wavelengths are equal to one another.

4. An optical film thickness measuring device according to claim 3 wherein said memory means stores the reflectance data corresponding to such values of the parameters ($n_1d_1/\lambda$ and $n_2d_2/\lambda$) as to satisfy the following relationship:

$$log(\lambda_{i+1}/\lambda_i) = log[(n_1d_1 + \Delta_1)/n_1d_1]$$
$$= log[(n_2d_2 + \Delta_2)/n_2d_2]$$

wherein the reference symbols $\Delta_1$ and $\Delta_2$ represent constants having finite values respectively, and the reference symbols $\lambda_i$ and $\lambda_{i+1}$ designate wavelengths of light neighboring to each other.

* * * * *

UNITED STATES PATENT AND TRADEMARK OFFICE
CERTIFICATE OF CORRECTION

PATENT NO. : 4,999,508
DATED : March 12, 1991
INVENTOR(S) : HYAKUMURA, Kazushi It is certified that error appears in the above-identified patent and that said Letters Patent is hereby corrected as shown below:

Col. 2, line 26, $R_m(\lambda_1) = R(d_1, d_2 ; \lambda_1)$

Col. 4, line 42, $R(n_1 d_1/\lambda \text{ and } n_2 d_2/\lambda)$

Col. 5, line 11, $R(n_1 d_{11}/\lambda_1, n_2 d_2/\lambda_2),\ldots,R(n_1 d_{11}/\lambda_k, n_2 d_{21}/\lambda_k)$ line 43, $(n_1 d_1/\lambda_1, n_2 d_2/\lambda_1)$ line 64, 20/11
line 65, 40/21

Col. 9, line 28, $[d_1]_0, [d_2]_0$

Signed and Sealed this

Thirtieth Day of November, 1993

BRUCE LEHMAN

Attest:

Attesting Officer

Commissioner of Patents and Trademarks